United States Patent [19]

Taylor

[11] Patent Number: 4,836,091
[45] Date of Patent: Jun. 6, 1989

[54] HYDRAULIC WORK SUPPORT

[75] Inventor: Warren G. Taylor, Rochester, Mich.

[73] Assignee: De-Sta-Co Division, Dover Resources, Inc., Troy, Mich.

[21] Appl. No.: 131,073

[22] Filed: Mar. 17, 1980

[51] Int. Cl.⁴ ............................................. B23B 31/30
[52] U.S. Cl. ........................................... 92/26; 92/27; 279/4; 279/50
[58] Field of Search ................... 92/24, 26, 27, 28, 29, 92/23; 188/67; 279/1 Q, 41 R, 43, 46 R, 50, 4

[56] References Cited

U.S. PATENT DOCUMENTS

| | | | |
|---|---|---|---|
| 2,346,706 | 4/1944 | Stoner | 279/46 R |
| 2,459,899 | 1/1949 | Stoner | 279/1 Q |
| 2,466,129 | 4/1949 | Stoner | 279/46 R |
| 2,880,007 | 3/1959 | Stoner | 279/1 Q |
| 3,203,513 | 8/1965 | Allen | 92/26 |
| 3,211,463 | 10/1965 | Nikitas | 279/4 |
| 3,273,907 | 9/1966 | Voderberg | 279/50 |
| 3,521,894 | 7/1970 | Haviland et al. | 279/4 |
| 3,556,259 | 1/1971 | Allen | 188/67 |
| 3,575,087 | 4/1971 | Sherwood | 92/28 |
| 3,643,765 | 2/1972 | Hanchen | 92/26 |
| 3,733,971 | 5/1973 | Sugimoto | 92/26 |
| 3,863,545 | 2/1975 | Kesti | 92/24 |
| 3,880,046 | 4/1975 | Sessody | 279/50 |
| 3,941,141 | 3/1976 | Robert | 92/24 |
| 4,185,539 | 1/1980 | Stratienko | 92/24 |

FOREIGN PATENT DOCUMENTS

| | | | |
|---|---|---|---|
| 206411 | 5/1956 | Australia | 92/26 |
| 1142814 | 2/1969 | United Kingdom | 92/28 |

Primary Examiner—Edward K. Look
Assistant Examiner—George Kapsalas
Attorney, Agent, or Firm—Lloyd M. Forster

[57] ABSTRACT

A spring actuated plunger work support seeks variable tolerance level of workpiece and is hydraulically locked in place to provide resistance to workpiece deflection imposed by processing loads. A collet with independent steel segments in a molded rubber body are preloaded in assembly and actuated by conical ended hydraulic piston having minimum travel to lock the work supporting plunger.

15 Claims, 1 Drawing Sheet

HYDRAULIC WORK SUPPORT

BACKGROUND OF THE INVENTION

Various hydraulically actuated work supports are known which seek to accomplish plunger clamping in a work support position. One commercial form employs a plurality of cylindrical pins inserted in the configuration of a roller bearing between stationary housing and movable plunger with an auxiliary wedge locking pin forced from the side to crowd between and provide an interference fit relative to the housing and work support plunger.

Another commercial design involves interfitting clutch plates respectively mounted on plunger and fixed housing elements which are hydraulically actuated to frictional engagement with the plunger at work support level.

A third known commercial construction, which comprises the most relevant known prior art, employs a three segment tapered collet closed by a conical ended piston which is hydraulically actuated and spring returned. An included angle of approximately 25° is employed in the conical end taper. The three segment collet is ground to finished dimension in a solid condition to provide a free fit clearance for the plunger size and then split into three segments. The result upon actuation is substantially a three line contact with the plunger as distinguished from a true surface area contact.

SUMMARY OF THE INVENTION

Applicant employs a collet having eight or more independent segments mounted in a molded rubber body preloaded during assembly to place the rubber under compression. The inner segment surfaces are accurately ground with cylindrical curvature precisely equal to that of the plunger to provide full area contact upon engagement. Preloaded assembly provides minimum bare clearance for free plunger movement in the release position and eliminates any need for a release return spring. A freely releasing 50° included conical collet angle together with bare release clearance minimizes piston travel to actuate the collet clamp so that only approximately 10 to 15 thousandths of an inch travel of the piston may be necessary between clamping and release condition. This permits the use of standard O-ring seals without sliding contact to eliminate or greatly minimize any seal wear.

In one embodiment of the invention a substantial stroke is provided for the plunger with an air pressure retraction feature to accommodate loading and unloading of workpieces when the normal free plunger position might interfere. Upon release of the air pressure the spring actuation of the plunger to a work support position is followed by hydraulic clamping.

DETAILED DESCRIPTION OF THE PREFERRED EMBODIMENT

Figure 1:
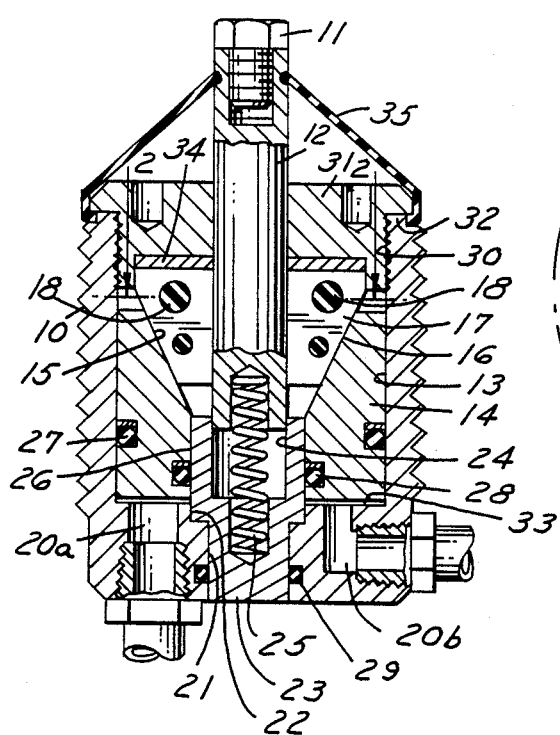
FIG. 1 is a sectional elevation of a preferred embodiment of the hydraulic work support.

With reference to FIG. 1 the preferred embodiment of the hydraulic work support comprises an outwardly threaded body 10 which may be installed in the base plate of any workpiece fixture or otherwise mounted in a fixed position where the upper rest button 11 of cylindrical plunger 12 may serve to support a workpiece when rigidly clamped. The body is provided with cylindrical bore 13 for cylindrical piston 14 having tapered opening 15 for engaging outer tapered surfaces 16 of independent steel segments 17 held in molded rubber body 18 to form collet 19 for engaging plunger 12 upon hydraulic actuation of piston 14 though either of alternate ports 20a or 20b provided in the lower end of body 10.

Small bore 21 in the lower end of the body and counterbore 22 provide a press fit seat for insert 23 which has cylindrical guide surface 24 for the inner end of plunger 12 as well as a seat for compression spring 25 serving to urge the plunger to its outermost freestate condition as shown in FIG. 1. Outer surface 26 of insert 23 mates with the inner working diameter of the piston 14 with the differential area of the bore 13 providing the effective area for hydraulic actuation of the piston.

Standard O-rings 27, 28 and 29 may be employed to seal hydraulic actuating pressures, which may be as high as 3000 p.s.i., from leaking without risk of wear problems since the slight piston travel involved can be accommodated through O-ring deflection without rubbing contact. The upper end of bore 13 is threaded at 30 to receive the threaded end of closure cap 31 having shoulder engagement 32 with housing end 10 when piston 14 bottoms at end 33 of bore 13 with collet 19 under compressive loading to provide bare free sliding clearance with plunger 12 so that minimal actuating travel of the piston 14, in the order of 10 to 15 thousandths of an inch, will serve to solidly clamp the plunger 12. A selective fit spacer washer 34 may be employed between the end cap and abutting ends of segment 17 to minimize piston travel. Optionally, washer 34 may be omitted and clearance provided in lieu of abutting surfaces at 32 so that during assembly with the plunger manually depressed, the cap 31 may be tightened to a clamping solution and then eased off to release the plunger under its spring load. At this point the cap may be staked or otherwise suitably secured, thereby assuring operation well within the resilient deflection capacity of the O-ring seals without sliding contact at the metal interface; and thus eliminating or minimizing seal wear and maximizing the service life of the work support without development of leakage.

The preloading of the resilient rubber 18 separating the segments assures free release of the plunger upon release of the hydraulic pressure without the necessity for any return spring contributing to the simplicity and compactness of the design. Elastomeric boot 35 accommodates inward plunger travel upon workpiece engagement maintaining sliding surfaces free of chips or abrasive particles. A close free sliding fit of plunger 12 within the end cap 31 and bore 24 in insert 23 provides lateral stability for the plunger and in effect an integral solid work support surface when the collet clamp is actuated. With the construction disclosed a 3000 psi hydraulic actuating pressure has been found to provide a 2000 pound axial holding capacity with no perceptible deflection under load.

Figure 3:
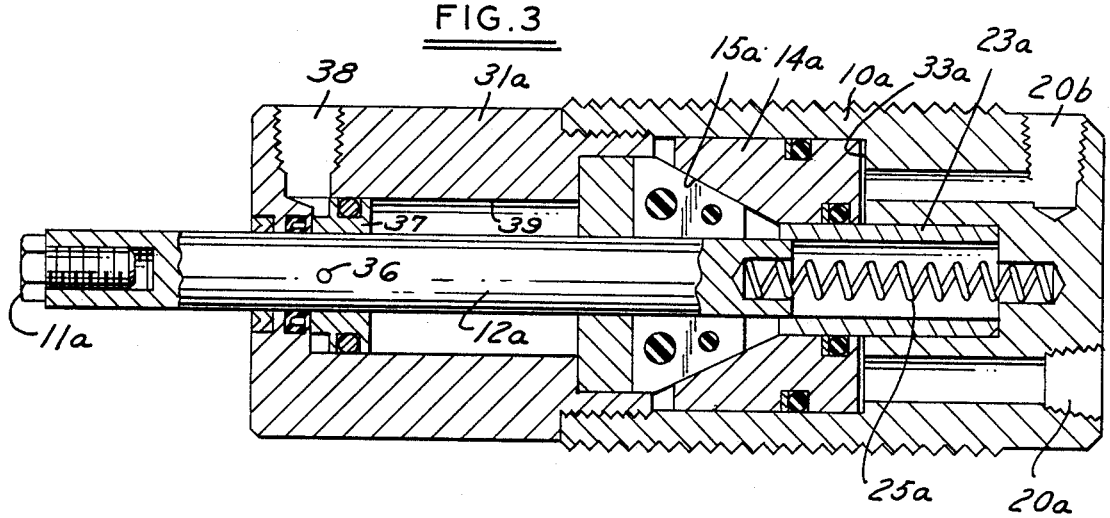
FIG. 3 is a sectional view of the modified embodiment providing an air retraction feature.

With reference to FIG. 3, elongated housing 10a is provided with elongated insert 23a and end cap 31a for plunger 12a pinned at 36 to piston 37 actuated by air or hydraulic pressure supplied through port 38 to move within cylinder 39 formed in end cap 31a in order to retract the plunger 12a against compression spring 25a which serves upon release of the air pressure to register the rest button 11a in support position against the workpiece. Hydraulic actuation of the clamp operates in all essential respects the same in both embodiments, the actuating pistons 14, 14a bottoming against the bore ends 33, 33a with respective collets barely free from plunger engagement so as to minimize clamp actuating piston travel. An included angle of approximately 50° in the tapered surfaces 15, 15a contribute in this respect compared to prior collets by more than doubling the ratio of radial movement to axial piston travel, the larger angle also more positively assuring complete release of the plunger through the preloaded compression of the rubber upon release of hydraulic pressure.

In both embodiments the multiple segments of the respective collets are ground with the true radius of the plunger and matching conical surface of the piston to provide full area contact at the inner engaging surfaces in final clamping position thereby providing a gripping action less susceptible to yielding or wear than in the case of three segment collets which engage with three line or highly limited area contacts upon the application of clamping pressure.

Figure 2:
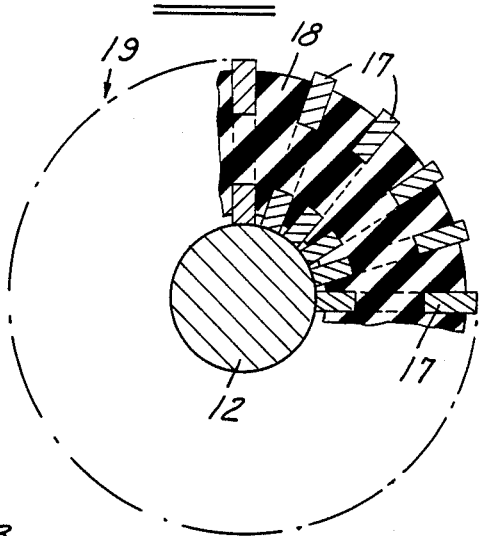
FIG. 2 is a sectional plan view taken along the line 2—2 of FIG. 1.

In the embodiment of FIGS. 1 and 2 the work support is installed at an appropriate level relative to the workpiece surface to be engaged, as when held in a machining fixture, with the upper rest button 11 positioned above the maximum height for workpiece engagement when plunger 12 is fully extended as shown in FIG. 1 and with the stroke of the plunger adequate to depress against the return spring 25 to the lowest position of support for the workpiece when held in the fixture. The return spring 25 is sufficiently light to yield under the workpiece to proper support level when the workpiece is otherwise clamped and positioned for machining. In this position hydraulic pressure applied either through passage 20a or 20b actuates piston 14 to engage the clamp and thereby retain the support button in rigid supporting position until the machining, or any similar operation requiring workpiece support, is completed.

With reference to the embodiment of FIG. 3 the operation of the work support is substantially the same as in FIG. 1 with the exception that retraction of piston 12a is effected through an air or hydraulic actuated piston 37 to accommodate loading and clamping of the workpiece without interference of rest button 11a after which release of fluid pressure from piston 37 permits return spring 25a to move rest button 11a into workpiece engagement.

I claim:

1. Hydraulic work support comprising a housing, an axially displaceable cylindrical plunger having a work support extension projecting from said housing, and hydraulic piston actuated collet means within said housing for clamping said plunger in a fixed axial position characterized by segmented resiliently preloaded collet means having a bare clearance free fit with said plunger upon release of hydraulic actuating pressure while said collet means remains preloaded.

2. The hydraulic work support of claim 1 including closure means for the end of said housing having an aperture for guided passage of said cylindrical plunger and a reaction shoulder for the end of said collet means.

3. The hydraulic work support of claim 1 wherein said hydraulic piston actuated collet means includes a conically end recessed piston and interengaging conically outer surfaced segments having an included conical angle effective to release clamping actuation upon release of hydraulic actuating pressure.

4. The hydraulic work support of claim 3 wherein said included conical angle is in the order of 50°.

5. The hydraulic work support of claim 1 wherein said collet means includes a plurality of individual rigid segments accurately processed with cylindrical segment inner surfaces precisely matching the cylindrical surface of said plunger for true area clamping contact.

6. The hydraulic work support of claim 5 including a common elastomeric body means for holding said segments in an expanded free state condition requiring radially inward compressive preloading for assembly and further loading to reach clamping position.

7. The hydraulic work support of claim 6 including means to limit piston actuating and release travel to the bare minimum required for engagement and release of said plunger in the order of 10 to 15 thousandths of an inch.

8. The hydraulic work support of claim 6 including means to limit piston actuating and release travel to the bare minimum required for engagement and release of said plunger.

9. The hydraulic work support of claim 8 including a piston bore in said housing having an end limiting piston travel.

10. The hydraulic work support of claim 9 including O-ring seal means interposed between piston and bore mating surfaces.

11. The hydraulic work support of claim 9 including guide means in said bore end of the inner end of said cylindrical plunger.

12. The hydraulic work support of claim 11 including a compression spring interposed between said plunger and guide means serving to yieldably urge said work support extension into work support engagement preparatory to hydraulic actuated clamping.

13. The hydraulic work support of claim 12 wherein said guide means has a cylindrical outer surface and said piston is provided with a cylindrical bore mating with said outer surface.

14. The hydraulic work support of claim 13 including O-ring seal means interposed between said guide means and piston bore mating surfaces.

15. The hydraulic work support defined in any of claims 1 to 2 including air pressure actuated means for retracting said work support extension to a clearance position for workpiece loading and unloading purposes, as well as means for returning said extension to a work support position upon release of said actuating air pressure.

* * * * *

UNITED STATES PATENT AND TRADEMARK OFFICE
CERTIFICATE OF CORRECTION

PATENT NO. : 4,836,091

DATED : June 6, 1989

INVENTOR(S) : Warren G. Taylor

It is certified that error appears in the above—identified patent and that said Letters Patent is hereby corrected as shown below:

Column 2, line 46, change "solution" to -- position --;

Claim 15, line 2, change "2" to -- 14 --.

Signed and Sealed this

Twenty-third Day of October, 1990

Attest:

HARRY F. MANBECK, JR.

*Attesting Officer*   *Commissioner of Patents and Trademarks*